US011003549B2

(12) United States Patent
Antonopoulos et al.

(10) Patent No.: US 11,003,549 B2
(45) Date of Patent: May 11, 2021

(54) CONSTANT TIME DATABASE RECOVERY

(71) Applicant: Microsoft Technology Licensing, LLC, Redmond, WA (US)

(72) Inventors: Panagiotis Antonopoulos, Redmond, WA (US); Adrian-Leonard Radu, Redmond, WA (US); Hanumantha Rao Kodavalla, Sammamish, WA (US); Peter Byrne, Charlotte Hall, MD (US); Wei Chen, Sammamish, WA (US); Raghavendra Thallam Kodandaramaih, Redmond, WA (US); Girish Mittur Venkataramanappa, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 298 days.

(21) Appl. No.: 16/045,715

(22) Filed: Jul. 25, 2018

(65) Prior Publication Data

US 2020/0034251 A1    Jan. 30, 2020

(51) Int. Cl.
*G06F 11/14* (2006.01)
*G06F 16/23* (2019.01)

(52) U.S. Cl.
CPC ...... *G06F 11/1469* (2013.01); *G06F 11/1474* (2013.01); *G06F 16/2365* (2019.01); *G06F 16/2379* (2019.01); *G06F 2201/87* (2013.01)

(58) Field of Classification Search
CPC ............. G06F 11/1469; G06F 11/1474; G06F 16/2365; G06F 2201/80; G06F 2201/87; G06F 11/1458; G06F 11/1461; G06F 11/1464; G06F 11/1466
See application file for complete search history.

(56) References Cited

U.S. PATENT DOCUMENTS

| 2004/0039962 A1 | 2/2004 | Ganesh et al. |
| 2005/0216462 A1 | 9/2005 | Xiao |
| 2007/0005664 A1 | 1/2007 | Kodavalla et al. |
| 2010/0191713 A1* | 7/2010 | Lomet ................. G06F 11/1471 707/704 |
| 2014/0365444 A1 | 12/2014 | Dhamankar et al. |

OTHER PUBLICATIONS

Wikipedia contributors. (Dec. 8, 2017). Algorithms for Recovery and Isolation Exploiting Semantics. In Wikipedia, The Free Encyclopedia. Retrieved 01:10, Aug. 5, 2020, from https://en.wikipedia.org/w/index.php?title=Algorithms_for_Recovery_and_Isolation_Exploiting_Semantics&oldid=814342388 (Year: 2017).*
"International Search Report and Written Opinion Issued in PCT Application No. PCT/US2019/038079", dated Sep. 24, 2019, 14 Pages.

* cited by examiner

*Primary Examiner* — William Spieler
(74) *Attorney, Agent, or Firm* — Fiala & Weaver P.L.L.C.

(57) ABSTRACT

Database recovery can be performed in substantially constant time. From a database transaction log, the state of one or more transactions is identified including those that were active at a time of a crash but not committed. Transactions can be reapplied sequentially starting from the beginning of a last successful checkpoint to the end of the transaction log. Uncommitted user transactions are not undone synchronously, but simply marked as aborted. Subsequently, versions of affected data elements can be reverted back to a prior saved version asynchronously.

20 Claims, 10 Drawing Sheets

CONSTANT TIME DATABASE RECOVERY

BACKGROUND

Databases are transactional systems that can provide certain guarantees, namely atomicity, consistency, isolation, and durability (known as ACID properties). Transactions are an action or series of actions that read or updates contents of a database. For example, a transaction can be a money transfer that debits a first account and credits a second account. An atomic transaction is one in which all actions are performed or none of the actions are performed. Money is not debited from the first account without also crediting the second account. Consistency refers to a requirement that a transaction change data in allowed ways to produce a new valid state from a prior valid state. For instance, money is not lost or gained. Isolation ensures transactions in process are isolated from each other. For example, the first account and the second account cannot be viewed until operations complete. Furthermore, changes are durable in that data remains in its correct state even in the event of failure or system restart.

At any point in time, a database may need to recover from a crash or failure, caused by loss of power, critical error in code, disk crash, or natural disaster, among other things. A database recovery process ensures a database is returned to a consistent state. Many databases employ the ARIES (Algorithm for Recovery and Isolation Exploiting Semantics) transactional recovery protocol. ARIES comprises three phases: analysis, redo, and undo. First, a transaction log is traversed to identify all transactions and their state at the time of a crash. Second, the transaction log is traversed chronologically to the end of the log, and operations are redone sequentially to bring the database back to a consistent state as of the time of the crash. Third, the transaction log is traversed backward from the end of the log to the oldest active transaction, and all operations performed by uncommitted transactions are undone or rolled back.

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to constant time database recovery. Recovery comprises identifying transactions specified in a transaction log of a database and redoing the transactions in chronological order starting from a last successful checkpoint to the end of the transaction log. Moreover, the uncommitted transactions are marked as aborted and further processing of the uncommitted transactions is performed asynchronously. Subsequently, transactions marked as aborted are identified and data is reverted to a prior committed version. Further, there is a subset of transaction operations that are not capable of being versioned. One class involves logical operations that are tied to a user transaction. These operations can be added to a secondary log, which can be used to redo and undo those transactions synchronously. Further yet, the transaction log can be truncated substantially by removing transactions prior to a checkpoint.

To the accomplishment of the foregoing and related ends, certain illustrative aspects of the claimed subject matter are described herein in connection with the following description and annexed drawings. These aspects are indicative of various ways in which the subject matter may be practiced, all of which are intended to be within the scope of the disclosed subject matter. Other advantages and novel features may become apparent from the following detailed description when considered in conjunction with the drawings.

DETAILED DESCRIPTION

Conventional database recovery protocol, comprising analysis, redo, and undo, performs recovery with respect to an oldest active transaction. Recovery time is thus proportional to the longest transaction size, which could be multiple hours for long running transactions. Such a lengthy recovery can cause the database to become unavailable to users for a prolonged period. In cloud environments, failures are considerably more frequent compared to on-premise and are not under a user's control. This causes unexpected downtime as well as significant outages that degrade quality of service. Further, since a transaction log from the oldest active transaction is utilized, significant disk space is required to maintain a log while a long running transaction is active.

The subject description pertains to database recovery in constant time. Recovery protocol is modified to enable recovery to be performed substantially in constant time as opposed to being dependent on the length of a long running active transaction. A transaction log can be analyzed to determine the state of transactions at the time of a crash including whether or not a transaction was committed or aborted. Transactions can next be redone or replayed in conjunction with forward traversal of the transaction log from the last successful checkpoint to the end of the transaction log. However, undo operations of an uncommitted transaction are not performed synchronously and backward from the end of the log to the oldest active transaction. Rather, uncommitted transactions are marked or labeled as such and further actions are performed asynchronously at a later time. Marked transactions can subsequently be utilized to revert affected data to a previously committed version of the data. Redo and undo thus need not process the transaction log from and to the oldest active transaction. Consequently, recovery time is bound by checkpoint periodicity, as opposed to varying based on an oldest active transaction, thereby significantly improving database availability.

The bulk of transactions are user transactions with physical operations that can be versioned. However, other user transaction operations that cannot be versioned may also occur including logical operations associated with locks and cache consistency, for example. To handle logical operations, as well as a limited set of physical operations that are not subject to versioning, a secondary or special log can be created that includes solely these operations. The secondary log can then be used to undo and redo such transaction operations in a synchronous manner with respect to the oldest active transaction. Nevertheless, database recovery time is not affected in any meaningful way due at least to the rarity in frequency and short processing time of such logical operations compared to physical operations.

Further, the transaction log can be truncated to reduce the amount of space needed to be allocated. More specifically, the transaction log can be aggressively truncated to remove transactions prior to a checkpoint. Truncation of the transaction log in this manner allows execution of large transactions using a small and constant amount of log space.

Various aspects of the subject disclosure are now described in more detail with reference to the annexed drawings, wherein like numerals generally refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Figure 1:
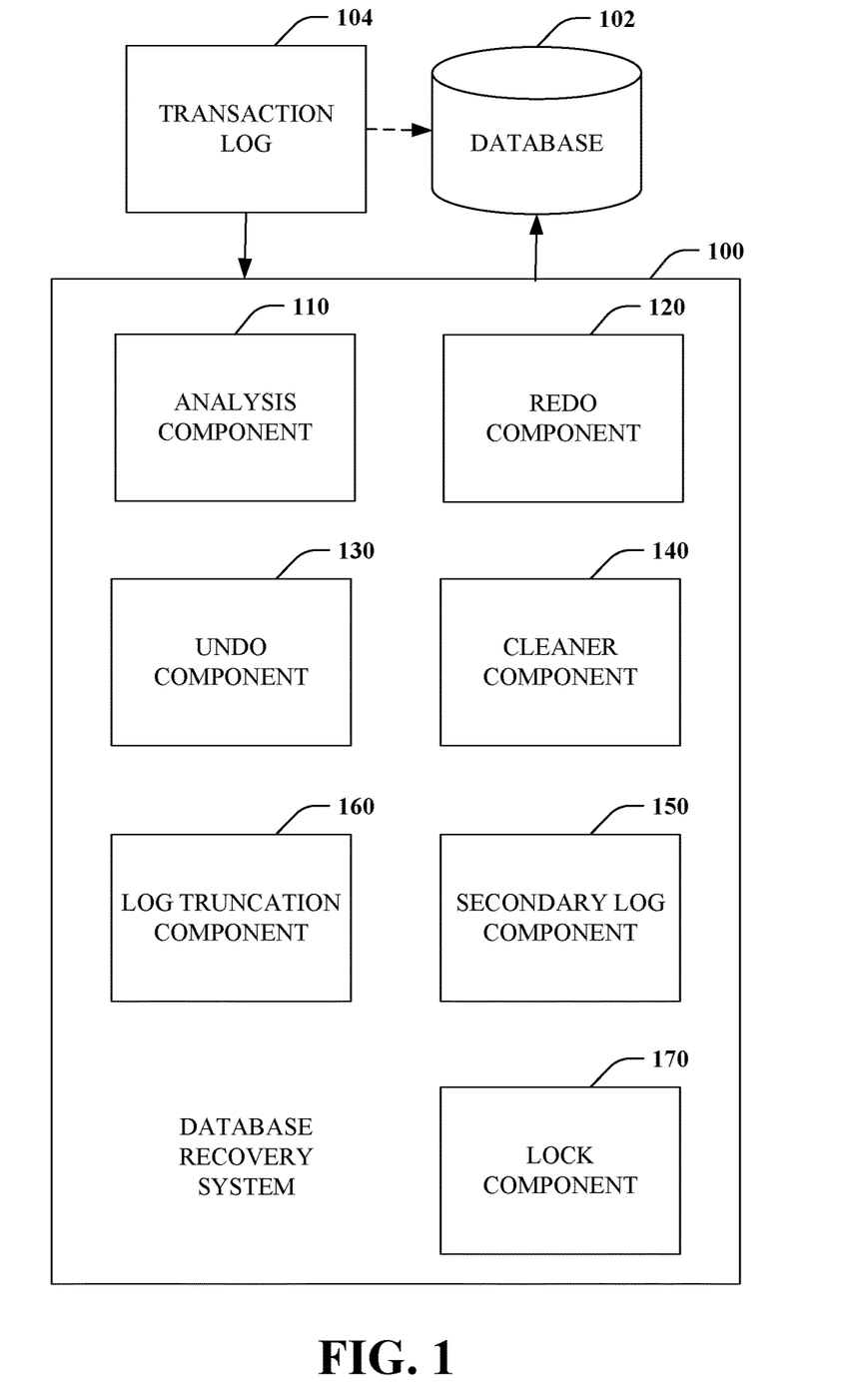
FIG. 1 is a schematic block diagram of a database recovery system.

Referring initially to FIG. 1, database recovery system 100 is illustrated. The database recovery system 100 interacts with database 102 and transaction log 104. The transaction log 104 is a write-ahead log in which all modifications to the database 102 are written to the transaction log before the modifications are applied to the database 102. The database 102 is a non-volatile computer readable storage medium. In one instance, the database 102 provides versioned storage for user data. Rather than making updates in place that replace current data, updates are effectively out of place. In other words, an update generates a new version of a data element which can be linked to the old version. By way of example, if a first account indicates a balance of $100 and a credit of $10 is added, the balance will be updated to be $110 by generating a new version that links back to the old balance of $100. The database recovery system 100 utilizes the transaction log 104 to enable recovery of the database 102 from a crash or other failure, for example resulting from a loss of power, disk crash, critical error, or natural disaster. The database recovery system 100 comprises analysis component 110, redo component 120, undo component 130, cleaner component 140, secondary log component 150, log truncation component 160, and lock component 170.

The analysis component 110 traverses the transaction log 104 and determines the state of each transaction after a crash. Checkpoints can be taken periodically (e.g., every two minutes) during normal processing and record active transactions, their states, and modified data (e.g., dirty pages) in a buffer pool. The analysis component 110 can start analysis from the last successful checkpoint and move forward to the end of the transaction log. Each transaction can be identified, and its state determined, such as whether the transaction committed or was aborted. The analysis component 110 can also determine additional information used by either or both of the redo component 120 and the undo component 130. By way of example, and not limitation, the analysis component 110 can determine the starting point of redo, namely the redo log sequence number, and the transactions to be undone or rolled back.

The redo component 120 is configured to redo transactions to reestablish the state of the database 102 at the time of a crash. Stated differently, the redo component 120 replays transactions. The transactions are replayed forward and sequentially from a starting point to the end of the transaction log. The starting point can be the time of the last successful checkpoint or a redo log sequence number identified by the analysis component 110. The database can be made unavailable until redo is complete due to possible state inconsistency.

The undo component 120 is configured to effectively undo uncommitted transactions to return the database to a consistent state. Traversing the transaction log backward, or in reverse chronological order, from the end of the transaction log to the oldest uncommitted transaction can be very time consuming. Consider for example, a transaction that updates every record in the database 102 to apply interest to an account. If the database 102 crashes before the transaction is committed to durable storage, all changes will need to be undone to maintain database consistency. In accordance with an aspect of this disclosure, the undo component 120 can merely mark or label a transaction as aborted or undone and defer subsequent processing. Each data element in the database 102 can be associated with a version and include a transaction identifier. If the transaction identifier is marked as aborted, the database 102 can revert to the previous value.

The cleaner component 140 is configured to perform a cleanup of the database that updates data to previous values or reclaim space. This cleanup process can be referred to as a logical revert. Logical revert is the operation that updates a data element with its last committed version. There can be two phases—identification and update. First, the cleaner component 140 can determine whether a data element, such as a row, belongs to an aborted transaction. This can be determined by a search for data elements with a transaction identifier that is marked as aborted. Second, an uncommitted row is replaced with the latest committed version. In one embodiment, the logical revert can be performed by executing a compensating operation, which can include insert, delete, or modify. For example, if the most recent version of a record on a page is ghosted, meaning the row is marked for deletion, the compensating operation is insert. By contrast, if a current version of a record is not a ghost record but the past committed record was null or a ghost record, the compensating operation is delete. Otherwise, the compensating operation is likely a modify operation, such as add $10 to an account to bring the account from $100 to $110. In accordance with one aspect, the cleaner component 140 and the logical revert process can be performed as a background process. Alternatively, such functionality can be triggered by an update transaction. For example, before a data element is updated a check can be made as to whether or not a data element is associated with a transaction marked as aborted. If the transaction is marked as aborted, logical revert can be initiated.

The secondary log component 150 generates a secondary or special log for a subset of operations. The bulk of database transactions are user transactions that perform physical operations (e.g., insert, update, delete . . . ) that can be versioned. There can be a subset of transaction operations that are not able to be versioned. One class involves logical operations that are still tied to a user transaction such as various metadata operations and management of corresponding caches and counters, among other things. If a corresponding transaction is to be rolled back, such logical operations can also be undone. However, undo of such transactions may not be able to be managed with versioning since they are logical and there is no physical object to version. For these operations, a secondary log can be generated and maintained to enable recovery. The secondary log can be a sequential log stream similar to the transaction log 104. Further, a checkpoint mechanism used to checkpoint the transaction log 104 can be altered to further support checkpointing the secondary log. During recovery the redo component 120 can reapply operations in the secondary log in chronological order from the oldest active transaction to the end of the log, and the undo component 130 can rollback operations associated with uncommitted transactions in reverse chronological order from the end of the secondary log. Given that the number of log records in the secondary log is quite small, the undo operation should complete within a negligible time, such as under one second.

The log truncation component 160 is configured to truncate one or both of the transaction log 104 and the secondary log, which reduces space provisioning and management. Since recovery utilizes the transaction log 104 starting from the beginning of the last successful checkpoint (and not from the oldest active transaction), the transaction log 104 can be truncated continuously by the log truncation component 160 as checkpoints occur to eliminate records before the checkpoint. More specifically, the transaction log 104 can be employed solely to redo versioned transactions from the start of a checkpoint to the end of the log. The transaction log is not utilized to undo versioned transactions, and some non-versioned transactions are processed in conjunction with the secondary log. This can allow users to execute large transactions, using a small, constant amount of space. The secondary log is concerned with the start of the oldest active transaction and the end of the log. Accordingly, the log truncation component 160 can eliminate any records that do not fall within this range.

In addition to non-versioned logical operations, there is a set of non-versioned system transactions associated with allocating new pages, storing additional data, or deallocating unused space. Operations associated with these system transactions are highly compacted (e.g., one bit for every sixty-four kilobytes) and difficult to version. Further, these operations need not be tied to user transactions. For instance, it is okay to allocate some additional space even if the space is not immediately used. Therefore, in accordance with one aspect of this disclosure, these system transactions can be performed as short-lived system transactions that can be quickly recovered in the case of a crash. By way of example, consider a bulk insert operation that requires allocation of additional space. A corresponding system transaction can be performed quickly and substantially immediately thereafter committed. Even though it is a small and quick operation, there is a possibility that the operation could fail in the middle of execution. A traditional approach can be performed where such an operation is redone and then undone, if not committed. Despite use of a traditional recovery approach, the transactions are infrequent and short, so they do not significantly affect recovery time.

The lock component 170 is configured to lock data that has yet to be cleaned up or undone. The database recovery system 100 can allow the database 102 to be available before full recovery has completed. Conventional database systems store locks acquired for each transaction in the transaction log and reacquire them during analysis and redo so that the database can be accessible while undo occurs. The database recovery system 100 allows database access before recovery completes without having to store and reacquire all locks for each transaction during recovery. Since each data element (e.g., row) version is marked with a transaction identifier of the transaction that generated the data element, the lock component 170 can apply an exclusive lock on the transaction identifier for each transaction that is pending recovery and make the database 102 available immediately after redo. Any new access to a data element version will need to acquire a shared lock on the transaction identifier of the version, therefore synchronizing with the transaction that is in the middle of recovery. Once the transaction has been fully redone, the transaction lock is released by the lock component 170, and all accesses can proceed normally. This significantly reduces the number of locks that need to be maintained and allows database availability without having to traverse the transaction log in order to reacquire all appropriate locks. Some database objects are not directly associated with data elements such as rows (e.g., object metadata), and thus locks still need to be logged and reacquired. However, since they are extremely infrequent, the secondary log can be employed for storing and reacquiring such locks during recovery without concern regarding the number of locks.

Figure 2:
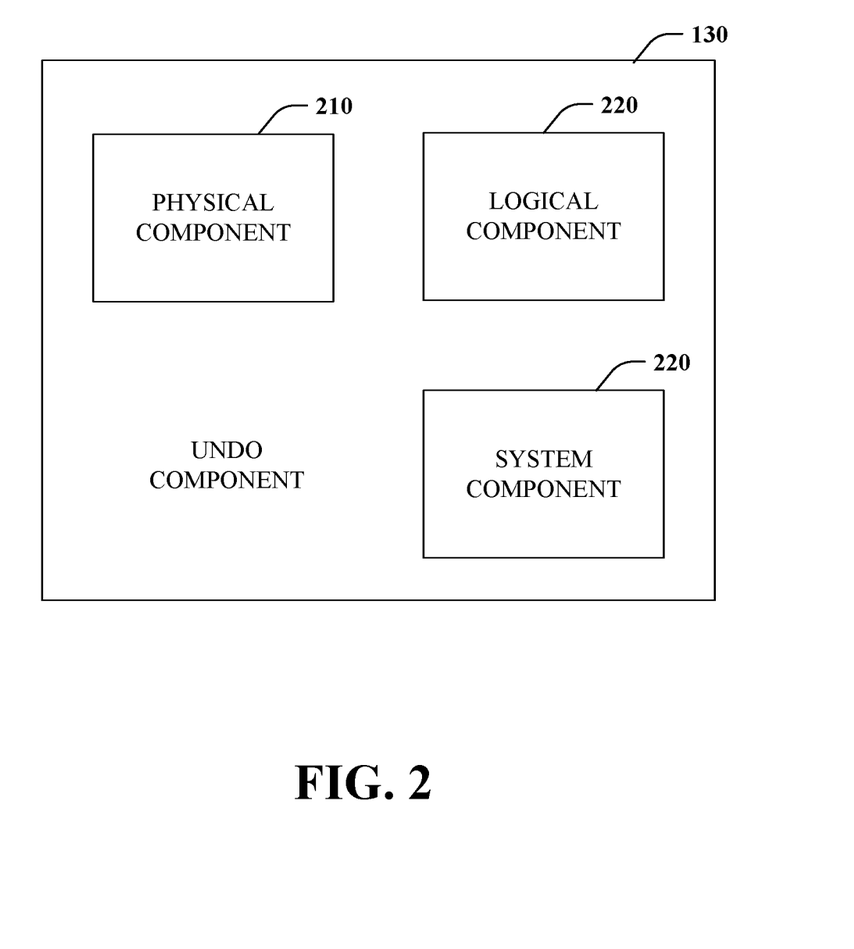
FIG. 2 is a schematic block diagram of an undo component.

Turning attention to FIG. 2, the undo component 130 is illustrated in further detail in accordance with one embodiment. The undo component 130 includes physical component 210, logical component 220, and system component 230. The undo component 130 is configured to undo operations of uncommitted transactions. However, the functionality of the undo component 130 can vary based on the type of transaction.

The physical component 210 operates with respect to physical operations comprising user transactions. In this case, rollback operations will be deferred and not occur synchronously as part of the undo process. Instead, user data modifications in the database are versioned, for example using row level versioning, and associated with a corresponding transaction that generated the version. If the transaction is to be rolled back because it did not commit, the transaction can be marked as "aborted" in a persistent store. These aborted versions can be lazily cleaned by a background thread that sweeps the database removing them. If a new user transaction attempts to update a row that has an aborted version, the page can be fixed to show the last committed version of the row.

The logical component 220 operates with respect to logical operations associated with user transactions. Logical operations can be tied to a user transaction such as various metadata operations and management of corresponding caches and counters, among other things. These operations may need to be rolled back if a corresponding user transaction does not commit prior to a crash. However, versioning is not applicable since the operations are logical and there is no physical object to version. These operations can be recorded in a secondary log in conjunction with a traditional undo, wherein logged operations generated by a transaction are rolled back in reverse chronological order from the end of the secondary log to the oldest active transaction.

The system component 230 operates with respect to operations associated with a system transaction. Such operations can involve operations on system pages such as index pages, allocation pages, and bitmaps, among other things. These operations are generally managing system data and do not necessarily need to be tied to the user transaction. Additionally, these pages are highly compacted and therefore versioning is not a suitable option. In these cases, all updates to such pages can be moved to internal short-lived transactions that will perform traditional undo but given their short length should not significantly affect recovery and the constant time associated therewith.

Figure 3:
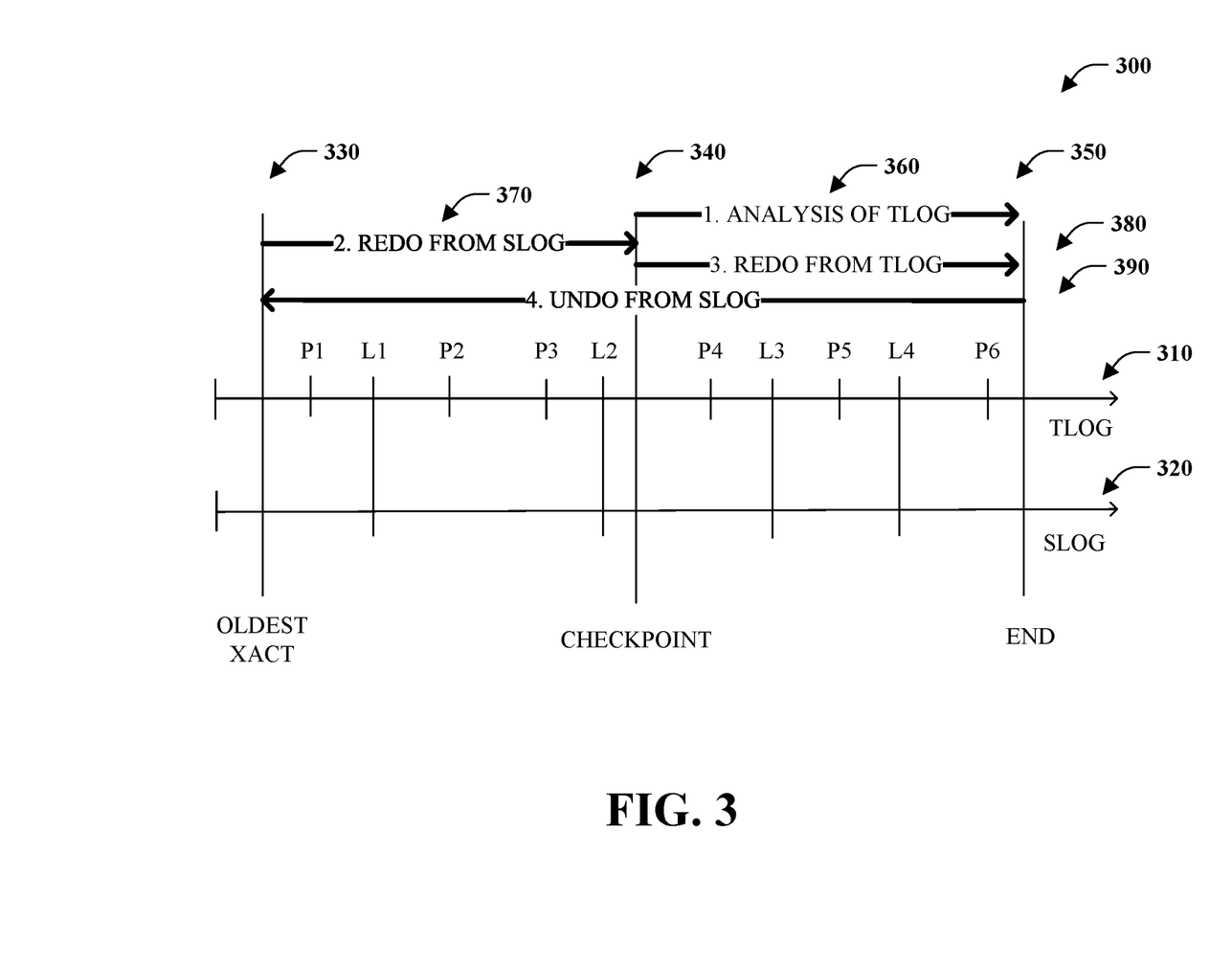
FIG. 3 is a timeline diagram of database recovery.

FIG. 3 is a timeline diagram 300 of a recovery process associated with physical and logical operations of user transactions to aid clarity and understanding. A transactional log timeline 310 is shown which includes a plurality of physical operation records (P1-P6) as well as logical operation records (L1-L4). Secondary log timeline 320 includes solely the logical operations (L1-L4). Physical operations can comprise insertion, deletion, or modification of a data element, such as a row of a table. Logical operations can comprise metadata operations and management of corresponding caches and counters, among other things. There are three discrete points in time denoted on both timelines, namely start of the oldest active transaction 330, checkpoint 340, and end of log 350. Database recovery can be initiated after a crash, for example occurring at the end of log 350. Recovery can first be initiated at 360 with an analysis process that analyzes the transaction log chronologically from the checkpoint 340 to the end of the log 350 to determine transactions and whether or not the transactions committed. Further, the secondary log can be loaded from the checkpoint. Next, at 370, redo of logical operations can be applied from the oldest transaction to the checkpoint, here L1 and L2. Redo can then be performed, at 380, from the transaction log chronologically from the checkpoint 340 to the end of the log 350. Further, redo can include reconstructing the secondary log by populating the secondary log with any logical operation records that came after the last checkpoint, thereby bringing the secondary log to the state it was at the time of the crash. Finally, at 390, uncommitted logical operations are undone in reverse chronological order from the end of the log 350 to the oldest active transaction 330. Versioning and logical revert are used to process uncommitted physical transactions, thereby avoiding rollback as part of a physical transaction undo in the recovery sequence.

The aforementioned systems, architectures, environments, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

In view of the exemplary systems described above, methods that may be implemented in accordance with the disclosed subject matter will be better appreciated with reference to the flow charts of FIG. 4-9. While for purposes of simplicity of explanation, the methods are shown and described as a series of blocks, it is to be understood and appreciated that the disclosed subject matter is not limited by the order of the blocks, as some blocks may occur in different orders and/or concurrently with other blocks from what is depicted and described herein. Moreover, not all illustrated blocks may be required to implement the methods described hereinafter. Further, each block or combination of blocks can be implemented by computer program instructions that can be provided to a processor to produce a machine, such that the instructions executing on the processor create a means for implementing functions specified by a flow chart block.

Figure 4:
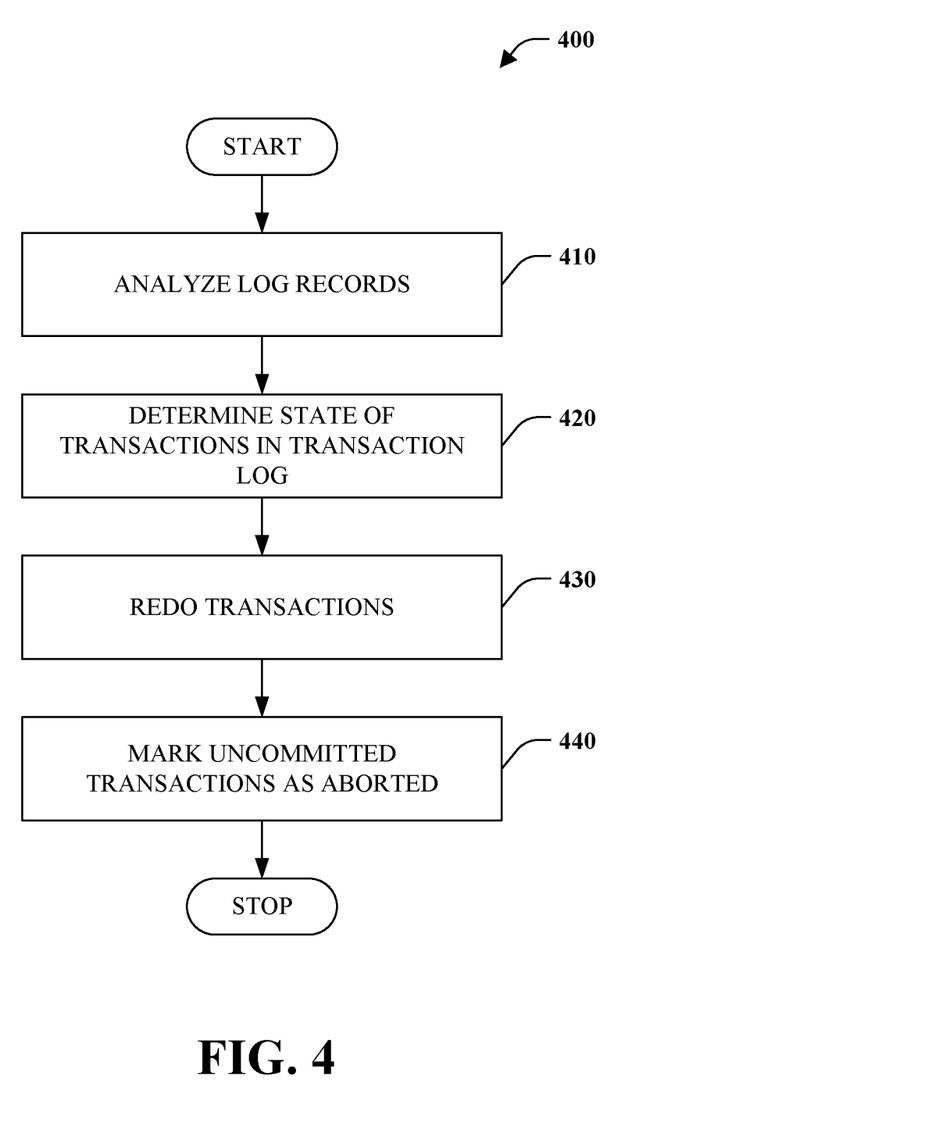
FIG. 4 is a flow chart diagram of a method of database recovery.

FIG. 4 illustrates a method of database recovery 400. At reference numeral 410, log records are analyzed by traversing a transaction log from a checkpoint to the end of the log. Among other things, the analysis can reveal active transactions and corresponding operations that were executing prior to a crash. In one implementation, the active transactions can be stored in a transaction table. State of identified active transactions is determined from the transaction log as well, at numeral 420. For example, the state can correspond to whether an active transaction committed (e.g., was written to disk) or not prior to the crash. In one implementation, this state information can be utilized to populate a dirty page table comprising identification of pages that were updated in a buffer in accordance with a particular log operation, but not written to disk. At reference numeral 430, operations for all transactions, even those transactions that did not commit, are redone or replayed to bring a database back to the state at the time of a crash. At reference numeral 440, uncommitted transactions are marked as aborted and further action is deferred. In other words, a conventional undo process is not performed synchronously in which the transaction log is scanned backward from the end and all operations undone for each uncommitted transaction. Rather, versioning and a logical revert can be performed asynchronously, to in effect, undo operations of aborted transactions, but at a later time and in a different way.

Figure 5:
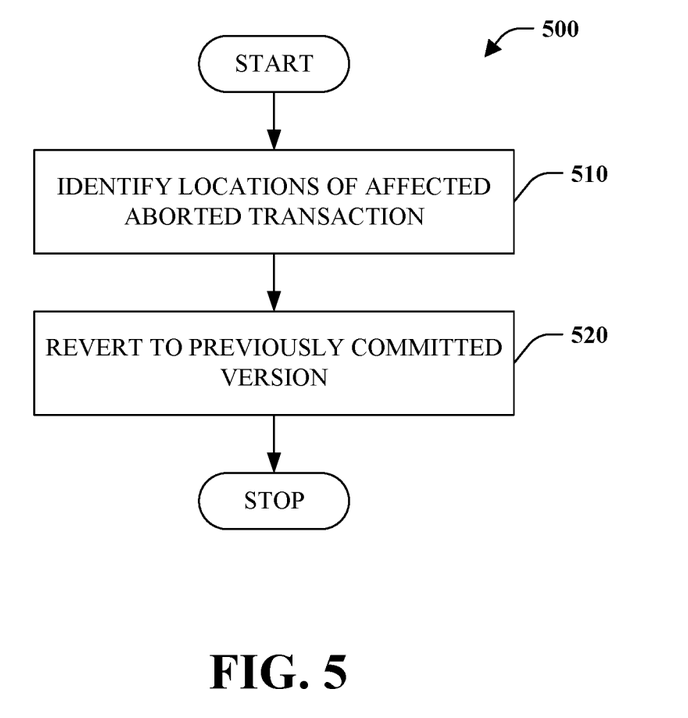
FIG. 5 is a flow chart diagram of a cleaner method.

FIG. 5 is a flow chart diagram of a cleaner method 500. Effects of operations of uncommitted transactions need not immediately be undone at least for physical user transactions. Instead, a background cleaner method 500 can asynchronously address the effects. At reference numeral 510, identification of one or more locations affected by aborted transactions can be identified. A data element or object, such as a row of a table, can include data as well as a transaction identifier associated with the data. Accordingly, locations can be identified by scanning for data with transaction identifiers that are marked as aborted, for example. At reference numeral 520, a current version of data is reverted to a previously committed version. Rather than making updates in place that replace current data, updates are effectively out of place. Stated differently, an update generates a new version of a data element which can be linked to the old version. Although not limited thereto, in one implementation, a logical revert can be performed by executing a compensating operation, which can include insert, delete, or modify.

Figure 6:
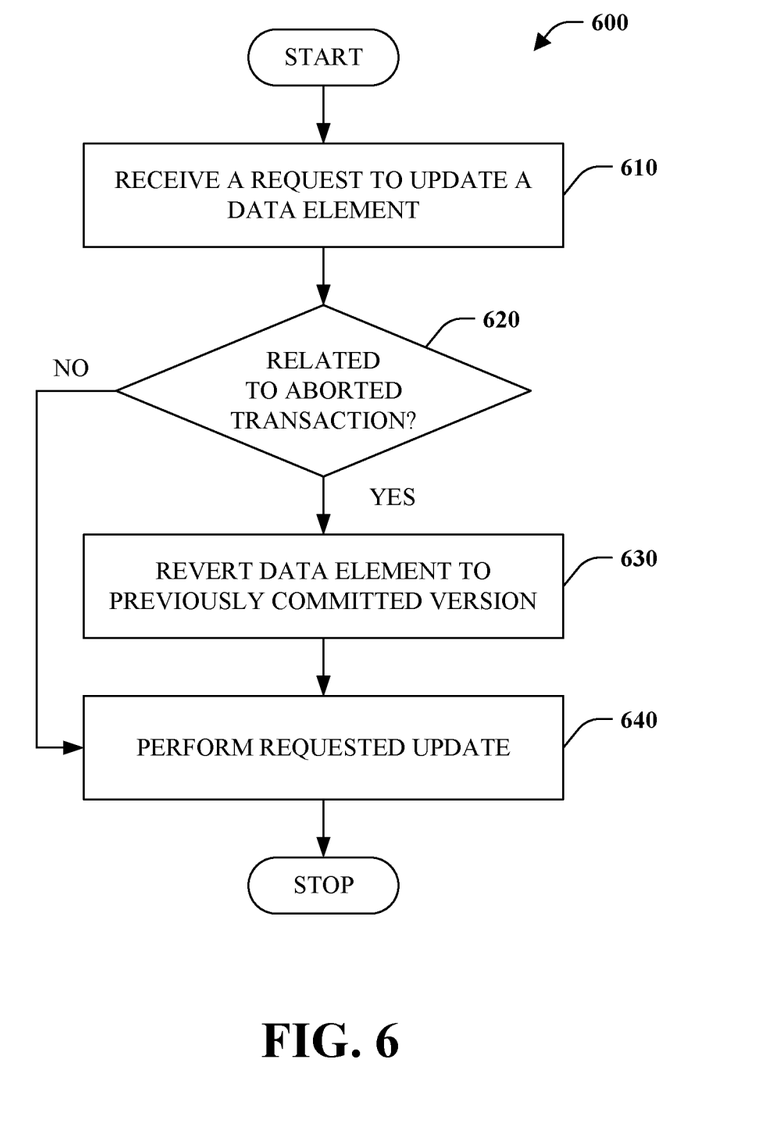
FIG. 6 is a flow chart diagram of a method of processing updates.

FIG. 6 illustrates a method 600 of processing updates in view of potential aborted transactions. At reference numeral 610, a request can be received to update a data element, such as a row of a table. At numeral 620, a determination can be made as to whether or not the data element is related to an aborted transaction. For example, a check can be made as to whether or not a transaction identifier associated with the data has been marked as aborted or not. If the data element is related to an aborted transaction ("YES"), the method continues at numeral 630 where the data element is reverted to a previously committed version. For example, a logical revert can be performed in which a compensating operation is applied to result in the previously committed version. Subsequently, at 640, the update request is performed. If, at 620, it is determined that the update does not concern a data element related to an aborted transaction ("NO"), the method proceeds directly to reference numeral 640, where the update request is performed.

Figure 7:
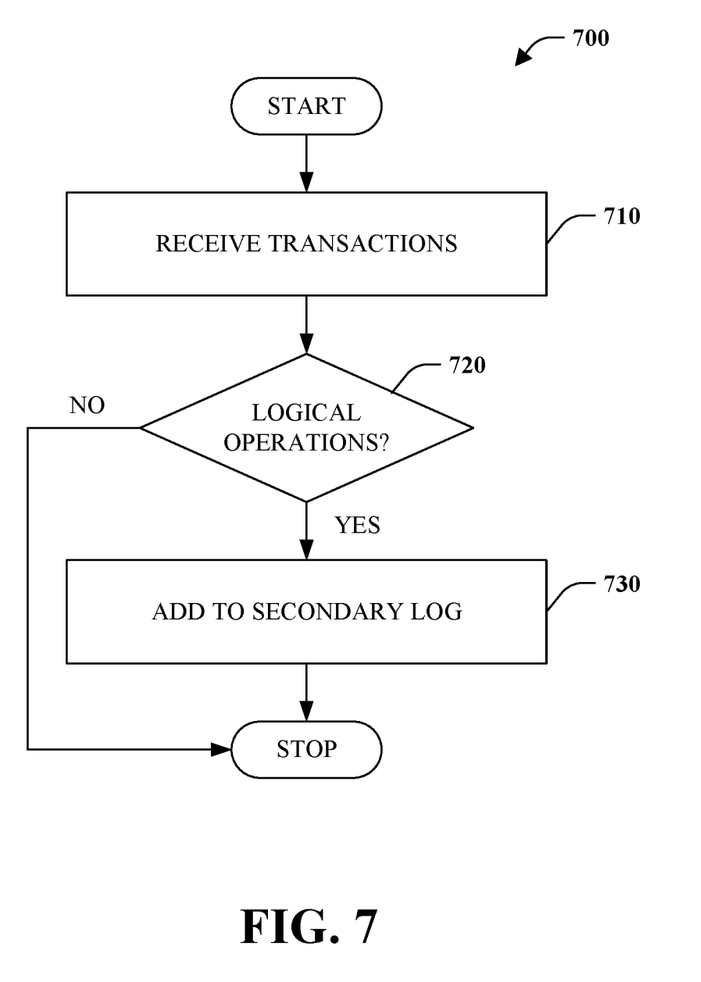
FIG. 7 is a flow chart diagram of a method of constructing a secondary log.

FIG. 7 is a flow chart diagram of a method 700 of constructing a secondary log. At numeral 710, a transaction comprising one or more operations is received, retrieved, or otherwise obtained or acquired from a transaction log. At reference numeral 720, a determination is made as to whether or not the transaction log includes one or more logical operations. Logical operations are tied to a user transaction and can comprise various metadata operations and the management of corresponding caches and counters, among other things. If, at 720, it is determined that there are no logical operations ("NO"), the method can terminate. Alternatively, if, at 720, it is determined that one or more logical operations are present ("YES"), the method proceeds to numeral 730, where the one or more logical operations are added to the secondary log. For example, during recovery, starting from a checkpoint, transactions can be analyzed, and logical operations added to the secondary log to support subsequent undo.

Figure 8:
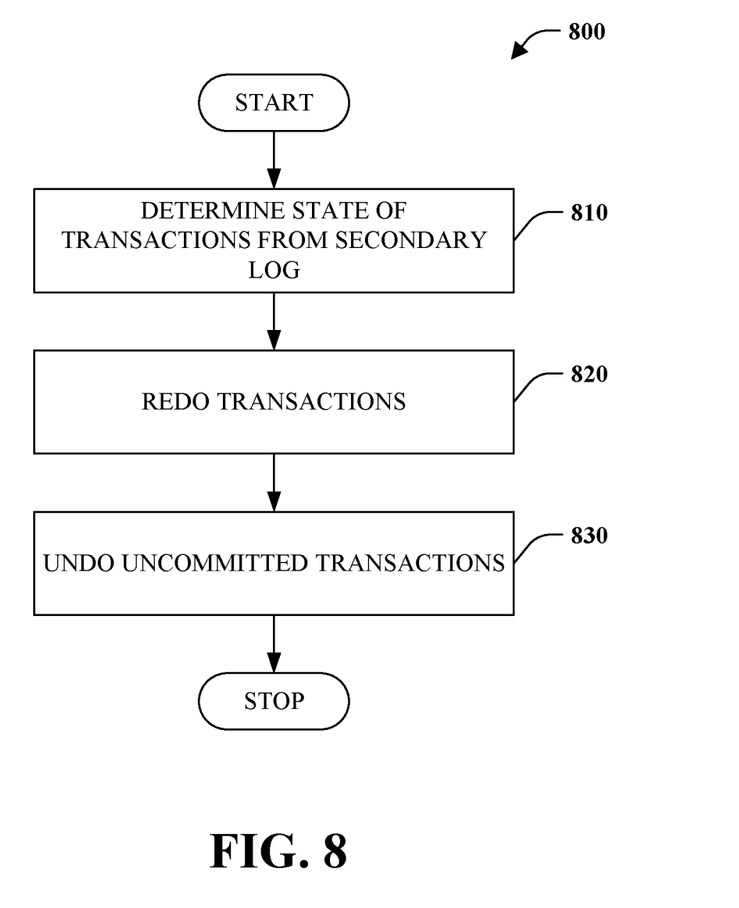
FIG. 8 is a flow chart diagram of a method of database recovery.

FIG. 8 depicts a method 800 of database recovery. At reference numeral 810, transactions in a secondary log are analyzed. The secondary log can be distinct from the transaction log in that it comprises solely logical operations and optionally a limited set of physical operations that do not support versioning. The outcome of analysis can be identification of all transactions, including aborted transactions at the time of a crash. At numeral 820, transactions are redone or reapplied chronologically from the oldest active transaction to the end of the log. As a result, the database will be in the state it was in at the time of crash with respect to transactions in the secondary log. At numeral 830, aborted, or uncommitted, transactions are undone. For instance, the secondary log can be traversed in reverse chronological order from the end to the oldest active transaction, and effects of aborted transactions are undone or rolled back by executing appropriate compensation actions.

Figure 9:
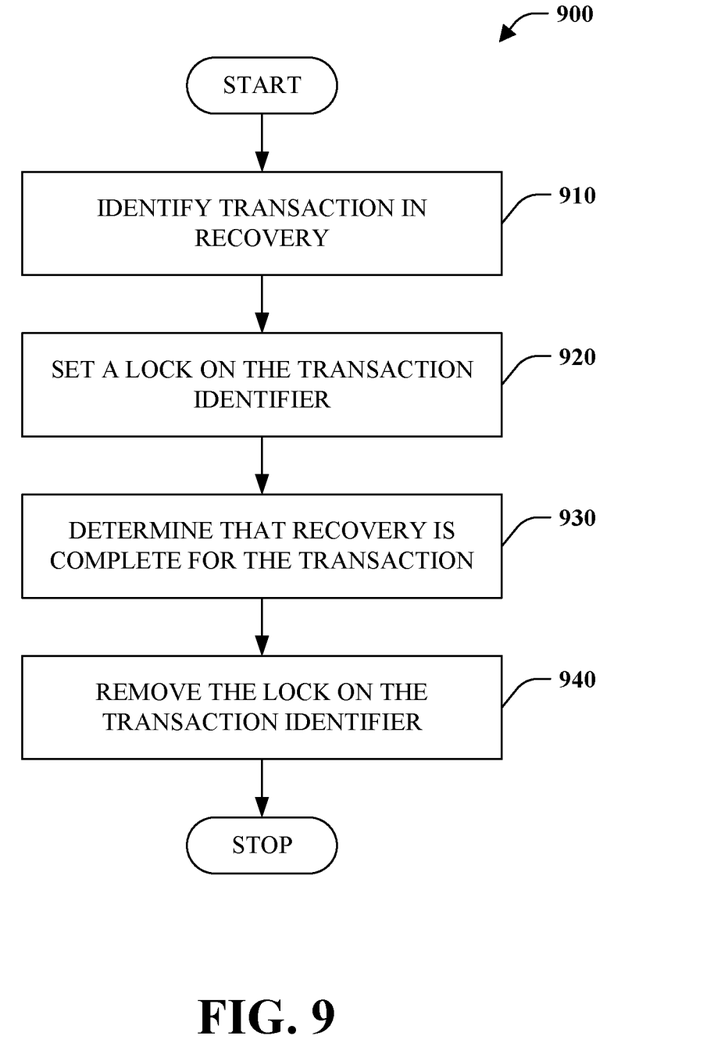
FIG. 9 is a flow chart diagram of a method of employing transaction locks during database recovery.

FIG. 9 is a flow chart diagram illustrating a method of employing transaction locks during database recovery. At reference numeral 910, a transaction that is in the process of recovery is identified. For example, a transaction can be marked as aborted if the transaction did not commit and actions need to be taken to undo the effects of that transaction. At numeral 920, an exclusive transaction lock is set on a transaction identifier associated with the transaction in recovery. As a result, any user query that tries to access data will be blocked by the lock. In accordance with one embodiment, data elements, such as rows of a table, can be associated with a transaction identifier. By applying a lock to this identifier, access to all data elements with the transaction identifier can be blocked without having to set a lock on each individual data element. At reference numeral 930, a determination can be made that recovery is complete for the transaction. In accordance with one embodiment, recovery can be deemed complete when rollback, or undo, of aborted transactions in the secondary log is complete. At numeral 940, the lock is removed, or released, from the transaction identifier. After the lock is released, logical revert to corresponding versions can occur asynchronously. Further, user queries are able to access and interact with the data. As an alternative to the above, a lock can be held until a transaction is identified as committed or aborted. There are cases when analysis can conclude immediately that a transaction was aborted, because there might be a need to access an external transaction manager, and in this case the lock is helpful.

Aspects of the subject disclosure pertain to the technical problems of processing time and storage requirements associated with database recovery. The technical features associated with addressing these problems include redoing user transactions from the beginning of the last successful checkpoint, versioning user operations and marking versions with an identifier of a corresponding transaction, and undoing user operations based on version. Further, a secondary log is generated for logical system and other transactions that are unable to be versioned. Additionally, the database transaction log can continuously be truncated as checkpoints occur thereby reducing requires storage space to a small and substantially constant amount between checkpoints. The secondary log can also be truncated to remove transactions prior to the oldest active transaction.

The subject disclosure supports various products and processes that perform, or are configured to perform, various actions regarding database recovery. What follows are one or more exemplary systems and methods.

A database recovery system comprises: a processor coupled to a memory, the processor configured to execute computer-executable instructions stored in the memory that when executed cause the processor to perform the following actions: determining state of one or more transactions identified in a transaction log associated with a database, wherein the database supports versioning of user data; redoing the one or more transactions sequentially as specified by the transaction log starting from the beginning of a last successful checkpoint to the end of the transaction log; and marking one or more uncommitted transactions of the one or more transactions as aborted. The system further comprises identifying a data element associated with a transaction identifier marked as aborted; and reverting the data element to a prior committed version. The system further comprises acquiring a secondary log that stores logical operations that are non-versioned. Further, the system comprises redoing the logical operations captured by the secondary log chronologically starting from the oldest active transaction to the end of the secondary log; and undoing uncommitted logical operations in reverse chronological order from the end of the secondary log to the oldest active transaction. The system further comprises applying a transaction lock on the transaction identifier and releasing the transaction lock after completion of the undoing of uncommitted logical operations. The system further comprises truncating the secondary log based on the longest active transaction and truncating the transaction log by removing transactions prior to a most recent successful checkpoint. The system further comprises redoing the transactions sequentially as specified by the transaction log starting the earlier of an oldest dirty page or the beginning of a last successful checkpoint.

A method of database recovery comprises: employing at least one processor configured to execute computer-executable instructions stored in a memory that when executed cause the at least one processor to perform the following acts: identifying active and uncommitted transactions specified in a transaction log of a database, wherein the database stores versions of user data; redoing one or more active transactions sequentially as specified by the transaction log starting from the beginning of a last successful checkpoint to the end of the transaction log; and marking one or more uncommitted transactions of the one or more transactions as aborted. The method further comprises identifying a data element associated with a transaction identifier marked as aborted; and reverting the data element to a prior saved version. The method further comprises identifying the data element in response to receiving a request to update the data element. The method further comprises applying a transaction lock on the transaction identifier while the data element is reverted to the prior committed version. The method further comprises generating a secondary log that stores logical transactions that perform non-versioned operations. Further, the method comprises redoing the transactions captured by the secondary log starting from the oldest active logical transaction and undoing uncommitted transactions backward from the end of the secondary log to the oldest active logical transaction. The method also comprises truncating the transaction log based on a most recent checkpoint.

A system of database recovery comprises: means for identifying active and uncommitted transactions from a transaction log after a crash of a database, wherein the database supports versioning of user data; means for redoing one or more active transactions from a last successful checkpoint forward to the end of the transaction log; and means for marking one or more uncommitted transactions as aborted and deferring undo. The system further comprises means for identifying data elements associated transaction identifier marked as aborted and means for reverting the data element to a previous saved version of the data element. The system of claim further comprises a means for acquiring a secondary log that that stores logical operations that perform non-versioned operations. Additionally, the system comprises means for redoing the transactions captured by the secondary log forward starting from the oldest active transaction to the end of the log and means for undoing uncommitted database transactions backward from the end of the secondary log to the oldest active transaction.

The term "dirty page," as used herein, refers to a page of data that has been modified in memory but has yet to be written to non-volatile storage, on disk for example. The page is termed dirty because it is different from its counterpart in non-volatile storage. When a page is read into memory from disk, for example, the page is clean. Subsequently, the page can be updated in memory by a user query and referred to as a dirty page.

As used herein, the terms "component" and "system," as well as various forms thereof (e.g., components, systems, sub-systems . . . ) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The conjunction "or" as used in this description and appended claims is intended to mean an inclusive "or" rather than an exclusive "or," unless otherwise specified or clear from context. In other words, "'X' or 'Y'" is intended to mean any inclusive permutations of "X" and "Y." For example, if "'A' employs 'X,'" "'A employs 'Y,'" or "'A' employs both 'X' and 'Y,'" then "'A' employs 'X' or 'Y'" is satisfied under any of the foregoing instances.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 10:
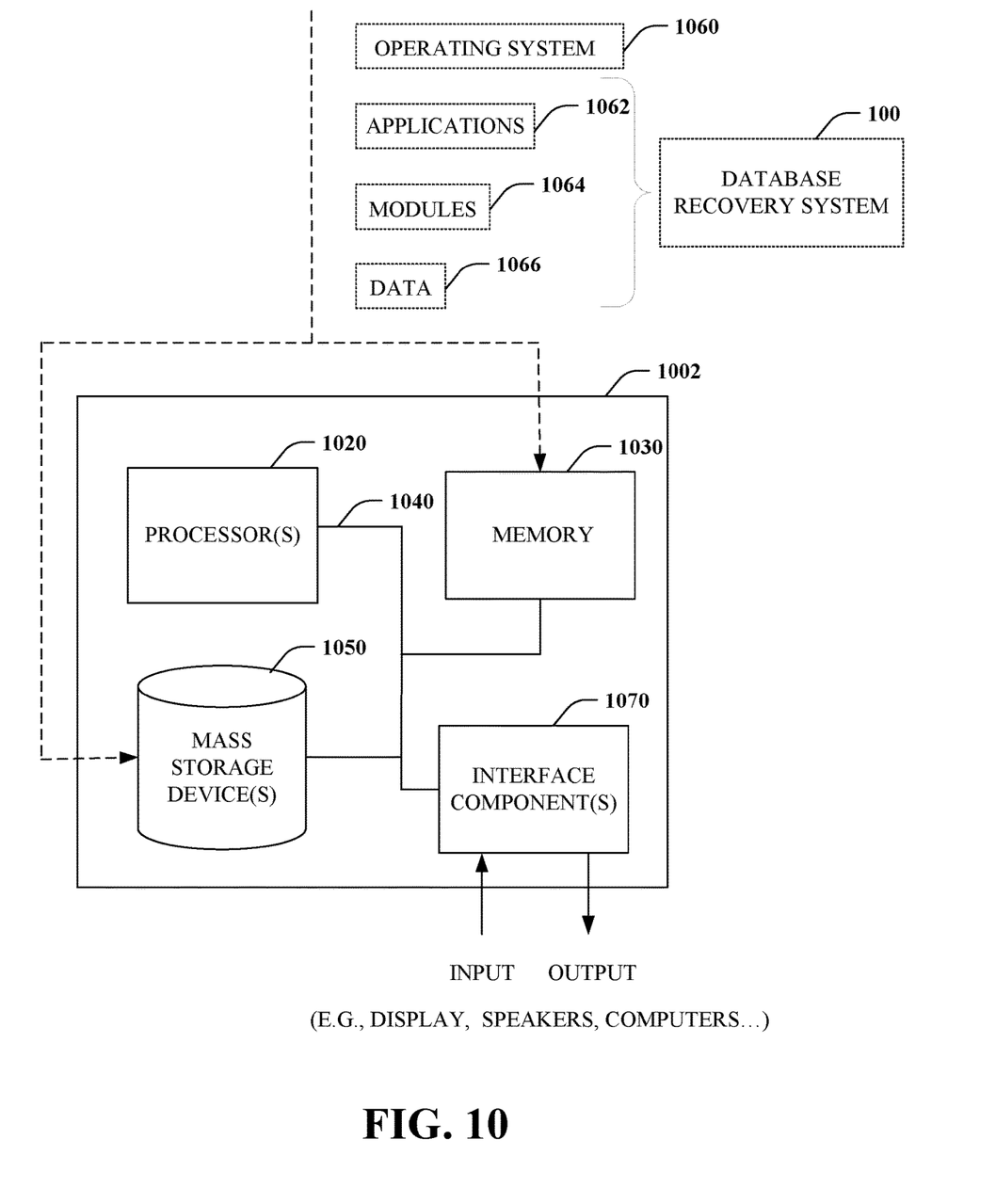
FIG. 10 is a schematic block diagram illustrating a suitable operating environment for aspects of the subject disclosure.

In order to provide a context for the disclosed subject matter, FIG. 10 as well as the following discussion are intended to provide a brief, general description of a suitable environment in which various aspects of the disclosed subject matter can be implemented. The suitable environment, however, is only an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, mainframe computers, as well as personal computers, hand-held computing devices (e.g., personal digital assistant (PDA), smart phone, tablet, watch . . . ), microprocessor-based or programmable consumer or industrial electronics, and the like. Aspects can also be practiced in distributed computing environments where tasks are performed by remote processing devices that are linked through a communications network. However, some, if not all aspects, of the disclosed subject matter can be practiced on stand-alone computers. In a distributed computing environment, program modules may be located in one or both of local and remote memory devices.

With reference to FIG. 10, illustrated is an example general-purpose computer or computing device 1002 (e.g., desktop, laptop, tablet, watch, server, hand-held, programmable consumer or industrial electronics, set-top box, game system, compute node . . . ). The computer 1002 includes one or more processor(s) 1020, memory 1030, system bus 1040, mass storage device(s) 1050, and one or more interface components 1070. The system bus 1040 communicatively couples at least the above system constituents. However, it is to be appreciated that in its simplest form the computer 1002 can include one or more processors 1020 coupled to memory 1030 that execute various computer executable actions, instructions, and or components stored in memory 1030.

The processor(s) 1020 can be implemented with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 1020 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 1020 can be a graphics processor.

The computer 1002 can include or otherwise interact with a variety of computer-readable media to facilitate control of the computer 1002 to implement one or more aspects of the disclosed subject matter. The computer-readable media can be any available media that can be accessed by the computer 1002 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other like mediums that store, as opposed to transmit or communicate, the desired information accessible by the computer 1002. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 1030 and mass storage device(s) 1050 are examples of computer-readable storage media. Depending on the exact configuration and type of computing device, memory 1030 may be volatile (e.g., RAM), non-volatile (e.g., ROM, flash memory . . . ) or some combination of the two. By way of example, the basic input/output system (BIOS), including basic routines to transfer information between elements within the computer 1002, such as during start-up, can be stored in nonvolatile memory, while volatile memory can act as external cache memory to facilitate processing by the processor(s) 1020, among other things.

Mass storage device(s) 1050 includes removable/non-removable, volatile/non-volatile computer storage media for storage of large amounts of data relative to the memory 1030. For example, mass storage device(s) 1050 includes, but is not limited to, one or more devices such as a magnetic or optical disk drive, floppy disk drive, flash memory, solid-state drive, or memory stick.

Memory 1030 and mass storage device(s) 1050 can include, or have stored therein, operating system 1060, one or more applications 1062, one or more program modules 1064, and data 1066. The operating system 1060 acts to control and allocate resources of the computer 1002. Applications 1062 include one or both of system and application software and can exploit management of resources by the operating system 1060 through program modules 1064 and data 1066 stored in memory 1030 and/or mass storage device(s) 1050 to perform one or more actions. Accordingly, applications 1062 can turn a general-purpose computer 1002 into a specialized machine in accordance with the logic provided thereby.

All or portions of the disclosed subject matter can be implemented using standard programming and/or engineering techniques to produce software, firmware, hardware, or any combination thereof to control a computer to realize the disclosed functionality. By way of example and not limitation, the database recovery system 100, or portions thereof, can be, or form part, of an application 1062, and include one or more modules 1064 and data 1066 stored in memory and/or mass storage device(s) 1050 whose functionality can be realized when executed by one or more processor(s) 1020.

In accordance with one particular embodiment, the processor(s) 1020 can correspond to a system on a chip (SOC) or like architecture including, or in other words integrating, both hardware and software on a single integrated circuit substrate. Here, the processor(s) 1020 can include one or more processors as well as memory at least similar to processor(s) 1020 and memory 1030, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the database recovery system 100 and/or associated functionality can be embedded within hardware in a SOC architecture.

The computer 1002 also includes one or more interface components 1070 that are communicatively coupled to the system bus 1040 and facilitate interaction with the computer 1002. By way of example, the interface component 1070 can be a port (e.g. serial, parallel, PCMCIA, USB, FireWire . . . ) or an interface card (e.g., sound, video . . . ) or the like. In one example implementation, the interface component 1070 can be embodied as a user input/output interface to enable a user to enter commands and information into the computer 1002, for instance by way of one or more gestures or voice input, through one or more input devices (e.g., pointing device such as a mouse, trackball, stylus, touch pad, keyboard, microphone, joystick, game pad, satellite dish, scanner, camera, other computer . . . ). In another example implementation, the interface component 1070 can be embodied as an output peripheral interface to supply output to displays (e.g., LCD, LED, plasma, organic light-emitting diode display (OLED) . . . ), speakers, printers, and/or other computers, among other things. Still further yet, the interface component 1070 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A database recovery system, comprising:
   a processor coupled to a memory, the processor configured to execute computer-executable instructions stored in the memory that when executed cause the processor to perform the following actions:
  determining a state of one or more transactions identified in a transaction log associated with a database, wherein the database supports versioning of user data;
  redoing the one or more transactions sequentially as specified by the transaction log starting from the beginning of a last successful checkpoint to the end of the transaction log;
  marking one or more uncommitted transactions of the one or more transactions as aborted;
  identifying a data element associated with a transaction identifier of one of the one or more uncommitted transactions marked as aborted; and
  reverting the data element to a prior committed version in an asynchronous background process or when the data element is updated.

2. The system of claim 1, wherein the actions further comprise performing a logical revert by applying compensating operations to the data element to produce the prior committed version.

3. The system of claim 1, wherein the actions further comprise:
  acquiring a secondary log that stores logical operations that are non-versioned; and
  using the acquired secondary log in a database recovery procedure.

4. The system of claim 3, wherein using the acquired secondary log in the database recovery procedure comprises:
  redoing the logical operations captured by the secondary log chronologically starting from the oldest active transaction to the end of the secondary log; and
  undoing uncommitted logical operations in reverse chronological order from the end of the secondary log to the oldest active transaction.

5. The system of claim 4, wherein the actions further comprise applying a transaction lock on a transaction identifier during recovery and releasing the transaction lock after completion of the undoing uncommitted logical operations.

6. The system of claim 3, wherein the actions further comprise truncating the secondary log based on the longest active transaction.

7. The system of claim 1, wherein the actions further comprise truncating the transaction log based on a most recent successful checkpoint.

8. The system of claim 1, wherein the actions further comprise redoing the transactions sequentially as specified by the transaction log starting at the earlier of an oldest dirty page or the beginning of a last successful checkpoint.

9. A method of database recovery, comprising:
  employing at least one processor configured to execute computer-executable instructions stored in a memory that when executed cause the at least one processor to perform the following acts:
    determining a state of transactions specified in a transaction log of a database, wherein the database stores versions of user data;
    redoing one or more transactions sequentially as specified by the transaction log starting from the beginning of a last successful checkpoint to the end of the transaction log;
    marking one or more uncommitted transactions of the one or more transactions as aborted;
    identifying a data element associated with a transaction identifier of one of the one or more uncommitted transactions marked as aborted; and
    reverting the data element to a prior committed version in an asynchronous background process or when the data element is updated.

10. The method of claim 9, wherein the acts further comprise identifying the data element in response to receiving a request to update the data element.

11. The method of claim 9, wherein the acts further comprise:
  generating a secondary log that stores logical operations that are non-versioned; and
  using the generated secondary log in a database recovery procedure.

12. The method of claim 11, wherein using the generated secondary log in the database recovery procedure comprises:
  redoing one or more transactions captured by the secondary log starting from the oldest active logical transaction; and
  undoing one or more uncommitted transactions backward from the end of the secondary log to the oldest active transaction.

13. The method of claim 9, wherein the acts further comprise truncating the transaction log based on a most recent checkpoint.

14. The method of claim 9, wherein the acts further comprise:
  identifying one or more system transactions captured in the transaction log;
  redoing one or more system transactions chronologically starting from the oldest active transaction to the end of the transaction log; and
  undoing one or more uncommitted system transactions in reverse chronological order from the end of the transaction log to the oldest active transaction.

15. A system of database recovery, comprising:
  a processor coupled to a memory, the processor configured to execute computer-executable instructions stored in the memory that when executed cause the processor to perform the following actions:
    determining state of transactions from a transaction log after a crash of a database, wherein the database supports versioning of user data;
    redoing one or more transactions from a last successful checkpoint forward to the end of the transaction log;
    marking one or more uncommitted transactions as aborted and deferring undo;
    acquiring a secondary log that that stores logical operations that are non-versioned; and
    using the acquired secondary log in a database recovery procedure.

16. The system of claim 15, wherein the actions further comprise:
  identifying data elements associated with a transaction identifier marked as aborted; and
  reverting at least one of the data elements to a previous saved version.

17. The system of claim 16, wherein using the acquired secondary log in the database recovery procedure comprises:
  redoing the logical operations captured by the secondary log forward starting from the oldest active transaction to the end of the secondary log; and
  undoing uncommitted logical operations backward from the end of the secondary log to the oldest active transaction.

18. The system of claim 16, wherein the actions further comprise identifying the data elements in response to receiving a request to update the data elements.

19. The system of claim 16, wherein the actions further comprise:
 performing a logical revert by applying compensating operations to the data elements to produce the prior committed version.

20. The system of claim 15, wherein the actions further comprise truncating the transaction log based on a most recent checkpoint.

\* \* \* \* \*